United States Patent [19]

Ludwig

[11] Patent Number: 4,973,860

[45] Date of Patent: Nov. 27, 1990

[54] CIRCUIT FOR SYNCHRONIZING AN ASYNCHRONOUS INPUT SIGNAL TO A HIGH FREQUENCY CLOCK

[75] Inventor: Thomas E. Ludwig, Irvine, Calif.

[73] Assignee: AST Research Inc., Irvine, Calif.

[21] Appl. No.: 346,076

[22] Filed: May 2, 1989

[51] Int. Cl.[5] .......................... H03K 5/13; H03K 7/00
[52] U.S. Cl. .................................... 307/269; 307/443; 307/480; 328/63
[58] Field of Search ............... 307/443, 480, 269, 590, 307/591; 328/63, 72; 375/111, 118

[56] References Cited

U.S. PATENT DOCUMENTS

| | | | |
|---|---|---|---|
| 4,408,333 | 10/1983 | Fujii | 328/63 |
| 4,498,176 | 2/1985 | Wagner | 307/269 |
| 4,730,347 | 3/1988 | Paul | 375/118 |
| 4,745,302 | 5/1988 | Hanawa et al. | 307/480 |
| 4,782,499 | 11/1988 | Clendening | 375/111 |

Primary Examiner—Timothy P. Callahan
Attorney, Agent, or Firm—Knobbe, Martens, Olson & Bear

[57] ABSTRACT

A circuit for synchronizing an asynchronous input signal with an internal time base clock operates at a high frequency. The circuit includes an input flip-flop that receives the input signal and an output flip-flop that provides an output signal that is synchronized with the internal time base clock. The input flip-flop and the output flip-flop are interconnected via logic circuitry so that any instability on the output of the input flip-flop caused by failure of the input signal to satisfy the setup and hold conditions of the input flip-flop are isolated from the output of the output flip-flop. The output of the output flip-flop is a stable signal that is synchronized with the internal time base clock.

7 Claims, 11 Drawing Sheets

CIRCUIT FOR SYNCHRONIZING AN ASYNCHRONOUS INPUT SIGNAL TO A HIGH FREQUENCY CLOCK

BACKGROUND OF THE INVENTION

1. Field of the Invention

The present invention is in the field of digital electronics, and, in particular, is in the field of digital data communications. More particularly, the present invention is related to interface circuits wherein an asynchronous input signal is synchronized to a local clock signal.

2. Description of the Related Art

In the field of digital electronics, it is often necessary to pass control and data signals between first and second digital circuits operating under control of independent time bases (i.e., independent clock signals). The communication between the first and second digital circuits is referred to as asynchronous communication since the signals generated by the first circuit at a particular time with respect to its internal clock signal can be received by the second circuit at random times with respect to the internal clock signal of the second circuit. In other words, the two circuits are not synchronized with respect to each other.

In order for a signal from the first circuit to be utilized by the second circuit, it is necessary to synchronize the signal with the internal time base of the second circuit. It is well known in the field of digital electronics to include synchronization circuits as part of the interface circuits between two mutually asynchronous digital circuits. Such synchronization circuits typically include a flip-flop, or other such clocked data storage device, that is clocked by a synchronizing clock signal that is synchronous with the internal time base of the circuit receiving the input signal. In such circuits, the input signal, or a buffered signal responsive to the input signal, is clocked into the flip-flop when the signal level of the synchronizing clock signal makes a transition from a first signal level to a second signal level (i.e., a high-to-low transition or a low-to-high transition). After a short delay, referred to as the propagation delay through the flip-flop, a signal or signals responsive to the input signal will appear on one or more outputs of the flip-flop. The output or outputs of the flip-flop will thus be synchronized with the internal time base of the receiving circuit.

Although such flip-flop type synchronizing circuits generally operate satisfactorily, there are known conditions wherein the asynchronous input signal does not satisfy the setup and hold times of the flip-flop. That is the input signal arrives at the receiving circuit at a time such that the input signal is changing at approximately the same time as the synchronizing clock signal is making the transition that clocks the input signal into the flip-flop. If the input signal changes logic levels shortly before the clocking transition, it does not satisfy the required setup time for the flip-flop. If the input signal changes logic levels during or shortly after the clocking transition, it does not satisfy the required hold time for the flip-flop. When either of these events occur, it is possible for the flip-flop to respond to the input signal in an undesirable manner. Rather than the outputs of the flip-flop simply changing to respond to the change in the input signal or staying the same until the next clocking transition of the synchronizing clock, the outputs may oscillate for an amount of time (referred to as the settling time) before stabilizing in one of the two stable output conditions. This instability is caused by an inherent race condition in the flip-flop that occurs when the setup and hold times are not satisfied. Because of the asynchronous relationship between the time bases of the two circuits, the race condition cannot be prevented in a single flip-flop.

Various circuits have been developed to compensate for the race condition so that the instability of the synchronizing flip-flop is not allowed to affect the operation of the receiving circuit. One well-known method of synchronization is to double buffer the input signal by connecting first and second flip-flops in series such that the data output of the first flip-flop is connected to the data input of the second flip-flop. In such circuits, the second flip-flop is clocked at a sufficiently long time after the first flip-flop is clocked so that the output of the first flip-flop will have stabilized prior to the clocking of the second flip-flop. Since the two flip-flops are synchronized to the same internal time base, the setup and hold times for the second flip-flop can be guaranteed so that the output of the second flip-flop will be stable after the propagation delay through the second flip-flop. The output of the second flip-flop is provided as the synchronized input signal to the rest of the receiving circuit.

The foregoing improvement is adequate in many cases; however, at higher clock rates, such as are found in many commercially available digital circuits, the internal time base of the receiving circuit may have a periodicity that is less than the settling time of the first flip-flop. Thus, if the first and second flip-flop were to be clocked by a synchronizing signal operating at the frequency of the internal time base, there is an unacceptable probability that the second flip-flop will be presented with a signal from the first flip-flop that is oscillating. The state of the output of the second flip-flop after it is clocked will be unpredictable because the state of the input is unpredictable. In addition, the input to the second flip-flop may not satisfy the setup and hold times of the second flip-flop, thus causing the output of the second flip-flop to oscillate, a clearly undesirable condition.

The latter described problem can be solved in part by using a synchronizing clock derived from the internal time base that has a lower frequency than the internal time base. However, in many cases it is undesirable to use such a lower frequency synchronizing clock signal. One disadvantage to such a solution is that the lower frequency clock signal is typically generated from the internal time base by a flip-flop or other divider circuit and thus the transitions in the lower frequency clock signal are delayed with respect to the transitions in the internal time base. When the internal time base has a high frequency, such as 40–66 MHz in microcomputers based upon 20–33 MHz 80386 microprocessors, or the like, the additional propagation delay is a substantial portion of the period of the internal time base. Thus, it is not desirable to synchronize the received input signal with a lower frequency synchronizing signal when the remainder of the receiving circuit is clocked with the internal time base.

It can thus be seen that it is desirable to have a synchronization circuit that synchronizes a received asynchronous input signal with a high frequency internal time base clock while avoiding the race condition described above.

Summary of the Present Invention

The present invention provides an elegant solution to the above-described problem. The present invention comprises a synchronization circuit that receives an asynchronous input signal and provides an output signal that is synchronized with a high frequency internal time base clock. The output signal is sufficiently isolated from the input signal so that any race condition that may occur as a result of the failure of the received input signal to satisfy the setup and hold times of synchronizing flip-flops is eliminated within the synchronization circuit Thus, the output signal presented to a circuit into which the present invention is incorporated also provides a single stable transition at a known propagation delay with respect to the internal time base clock. Thus, the present invention avoids the above-described problems with the prior art circuits.

In the preferred embodiment, the present invention is a synchronization circuit that synchronizes an asynchronous input signal having first and second logic levels with a high frequency system clock signal. The synchronization circuit uses clocked logic circuits having minimum required setup and hold times for data input signals. The synchronization circuit comprises a clock generator that generates a first clock signal having a frequency that is less than the frequency of the system clock.

The synchronization circuit includes a first clocked logic circuit having a clock input terminal connected to receive the first clock signal from the clock generator. The first clocked logic circuit has a data input terminal that receives the asynchronous input signal and has a data output terminal. The first clocked logic circuit is responsive to a predetermined logic level transition of the first clock signal to provide a first output signal on the data output terminal that has a logic level responsive to the logic level of the asynchronous input signal when the predetermined logic level transition of the first clock signal occurs. The output signal has an unstable logic level when the logic level of the asynchronous input signal changes too close in time to the predetermined logic level transition of the first clock signal.

A second clocked logic circuit is included that has a clock input terminal, a data input terminal that is responsive to a data input signal with two logic levels, and a data output terminal that provides a data output signal having two logic levels. The clock input terminal of the second clocked logic circuit is connected to receive the system clock signal. The second clocked logic circuit is responsive to a predetermined transition of the system clock signal to provide a second output signal on the data output terminal that is responsive to the logic level of the data input signal on the data input terminal. The second output signal is synchronized with the system clock signal.

The synchronization circuit further includes a logic circuit interposed between the data output terminal of the first clocked logic circuit and the data input terminal of the second clocked logic circuit that receives the first output signal and generates the data input signal to the second clocked logic circuit. The interposed logic circuit enables the data input signal to the second clocked logic circuit to change only at a time that is sufficiently spaced apart from the predetermined transition of the system clock signal so that the minimum required setup and hold times of the second clocked logic circuit are satisfied, thereby preventing the second output signal from being unstable.

BRIEF DESCRIPTIONS OF THE DRAWING FIGURES

DETAILED DESCRIPTION OF THE PREFERRED EMBODIMENTS

Figure 1:
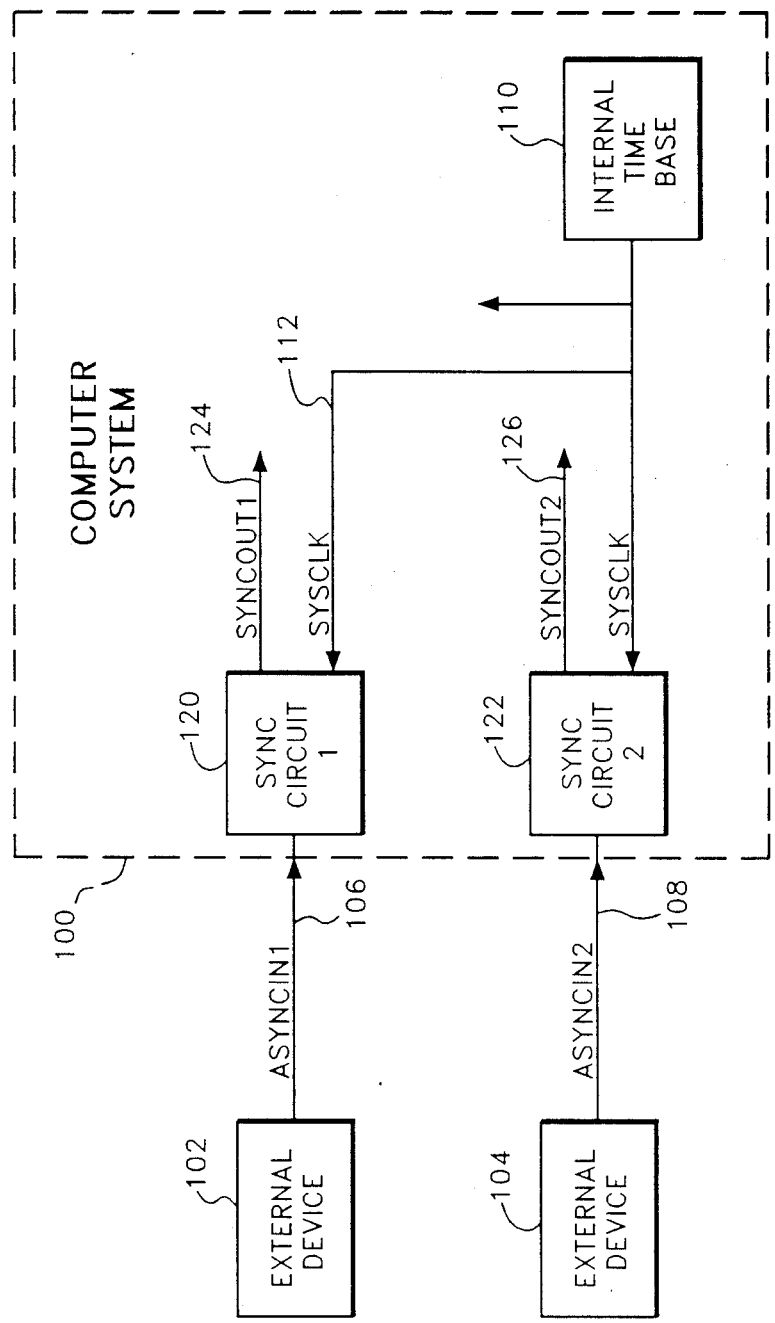
FIG. 1 is a block diagram of an exemplary computer system connected to a pair of asynchronous external devices and further showing a corresponding pair of synchronization circuits for synchronizing signals from the external devices with an internal time base of the computer system.

FIG. 1 illustrates an exemplary computer system 100 into which the improved synchronization circuit of the present invention may be incorporated. As illustrated, the computer system 100 is connected to a first external device 102 and a second external device 104 via a first asynchronous input line (ASYNCIN1) 106 and a second asynchronous input line (ASYNCIN2) 108, respectively. Such asynchronous input lines are used, for example, to communicate handshaking signals from the external devices 102, 104 to the computer system 100. Such handshaking signals are used, for example, by one of the devices to indicate to the computer system 100 that the device has data available to communicate to the computer system 100 or to acknowledge that it has received data or commands from the computer system 100. The use of handshaking signals to communicate between systems is well known in the art. As used herein, the same identification name is used for a signal on a signal line and the signal line itself. For example, the signal on the ASYNCIN1 input line 106 is the ASYNCIN1 signal.

As further illustrated in FIG. 1, the internal clocked logic of the computer system 100 is controlled by an internal time base clock 110 that generates a system clock signal (SYSCLK) on a SYSCLK line 112 The SYSCLK signal is a common clock (i.e., time base) for the computer system 100. By connecting all the clocked logic circuits in the system to this common clock or to a derivative of the common clock, the outputs of all the clocked logic circuits within the computer system 100 are caused to change in synchronism with each other so that the signal outputs can be logically combined without causing race conditions which may occur when combining asynchronous logic signals.

Typically, external devices, such as the first and second external devices 102, 104 are asynchronous devices. In other words, the external devices are not connected to the SYSCLK signal from the internal time base 110 of the computer system 100 and thus are not synchronized with the logic circuits within the computer system 100. Thus, the asynchronous input signals ASYNCIN1 and ASYNCIN2 cannot be communicated directly to the internal logic circuits of the computer system 100 without causing a substantial probability of causing race conditions within the logic circuits to which the asynchronous input signals are introduced.

In order to provide the asynchronous input signals to the internal logic circuits of the computer system 100 without causing race conditions, the first asynchronous input signal on the ASYNCIN1 line 106 is connected to a first synchronization circuit (SYNC CIRCUIT 1) 120 and the second asynchronous input signal on the ASYNCIN2 line 108 is connected to a second synchronization circuit (SYNC CIRCUIT 2) 122. As is well known in the art, the first and second synchronization circuits 120, 122 operate to synchronize the respective asynchronous input signals ASYNCIN1 and ASYNCIN2 with the SYSCLK signal and generate synchronized output signals that can be combined with the clocked logic circuits within the computer system 100. The output of the first synchronization circuit 120 is a first synchronized output signal SYNCOUT1 on a SYNCOUT1 line 124. The output of the second synchronization circuit 122 is a second synchronized output signal SYNCOUT2 on a SYNCOUT2 line 126.

Figure 2:
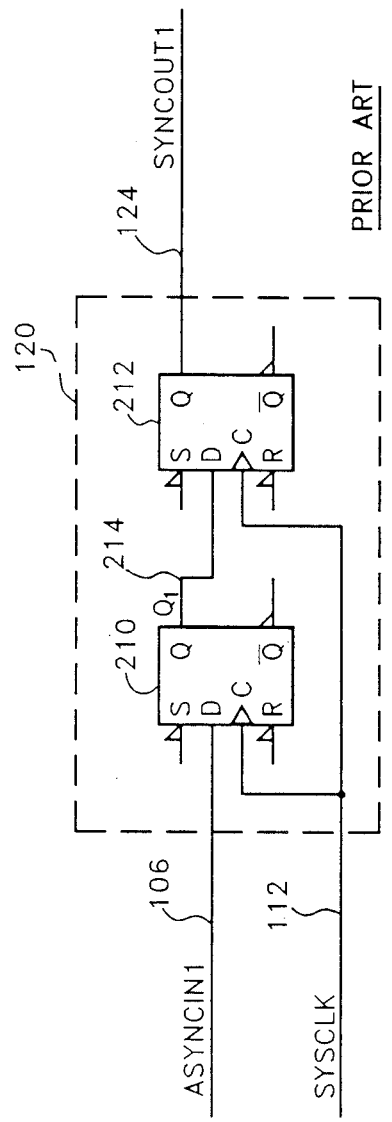
FIG. 2 illustrates a logic diagram of a typical prior art synchronization circuit such as may be used in the computer system of FIG. 1, the synchronization circuit having first and second series connected flip-flops that synchronize the asynchronous input signal with the internal time base clock.

FIG. 2 illustrates an exemplary prior art synchronization circuit 120 that can be used as the first synchronization circuit 120 or the second synchronization circuit 122. The synchronization circuit 120 will be described below assuming that it is used for the first synchronization circuit 120, and is thus shown receiving the SYSCLK signal on the SYSCLK line 112, receiving the first asynchronous input signal ASYNCIN1 on the ASYNCIN1 line 106, and generating the first synchronized output signal SYNCOUT1 on the SYNCOUT1 line 124. It should be understood that in many computer systems, the asynchronous input signals are received via line receivers that convert the received signals from voltage levels used for line transmission to logic voltage levels. Such line receivers are not required in many computer systems and are not shown in FIG. 2.

The synchronization circuit 120 comprises a first flip-flop 210 and a second flip-flop 212. The two flip-flops 210, 212 are illustrated as D-type flip-flops, and the flip-flops described hereinafter in the improved circuits of the present invention will also be described as D flip-flops. For example, the two flip-flops 210, 212 are advantageously SN74AS74 integrated circuit available from Texas Instruments, Inc., or an equivalent integrated circuit available from a number of other integrated circuit manufacturers. It should be understood that other clocked flip-flops can also be used with suitable modifications to the described circuits For example, the flip-flops can advantageously be embodied as part of a programmable array logic (PAL) circuit, or the like.

As illustrated, each of the flip-flops 210, 212 has a data input D, a clock input CLK, a true data output Q and a complementary data output $\overline{Q}$. The operation of such flip-flops is well known in the art. Basically, when the clock signal on the CLK input of the flip-flop changes from a low logic level to a high logic level, the logic level of a signal on the D input is transferred to the Q output. At the same time, the opposite logic level is transferred to the $\overline{Q}$ output. The logic levels on the Q output and the $\overline{Q}$ output change after a short time delay after the transition in the clock signal input. The time delay from the transition in the clock signal on the CLK input to one of the outputs is referred to as the propagation delay from the CLK input to the respective output.

In the implementation of FIG. 2 using SN74AS74 flip-flops, each of the flip-flops 210, 212 includes a set input S and a reset input R. The set input S is an active low signal input that can be used to force the Q output to a high logic level and the $\overline{Q}$ output to a low logic level irrespective of the logic levels of the D input and the CLK input. Similarly, the reset input R is an active low signal input that can be used to force the Q output to a low logic level and the $\overline{Q}$ output to a high logic level. In FIG. 2, the set inputs S and the reset inputs R of the two flip-flops 210, 212 remain in their inactive states. Although not shown, the set inputs S and the reset inputs R of the two flip-flops 210, 212 are preferably connected to a high logic level to assure that they remain inactive. In circuits using PAL's, or the like, the set and reset inputs are not incorporated into the flip-flops, and they will not be shown hereafter in association with the embodiments of the present invention.

The two flip-flops 210, 212 are connected in series with the Q output Q1 of the first flip-flop 210 connected to the D input of the second flip-flop 212 via a Q1 signal line 214. The CLK inputs of the first and second flip-flops 210, 212 are connected to the system clock SYSCLK via the SYSCLK line 112 described above in connection with FIG. 1 so that the first and second flip-flops 212, 212 are clocked at the same time.

The asynchronous input signal ASYNCIN1 from the first external device 102 (FIG. 1) is connected to the D input of the first flip-flop 210 via the ASYNCIN1 line 106. The Q output of the second flip-flop 212 is the first synchronized output signal SYNCOUT1 on the SYNCOUT1 line 124. As discussed above, the synchronized output signal SYNCOUT1 is provided to the logic circuits of the computer system 100 (FIG. 1).

Figure 3:
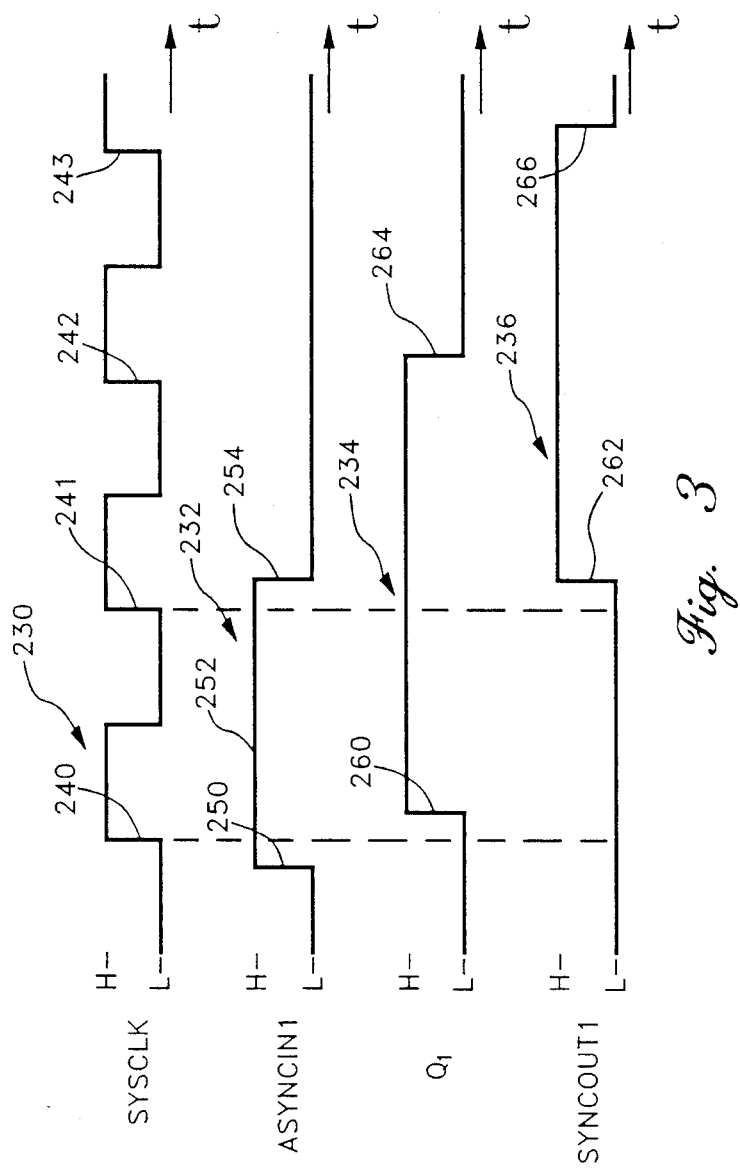
FIG. 3 illustrates timing diagrams that are typically associated with the synchronization circuit of FIG. 2.

The operation of the first and second flip-flops 210, 212 in synchronizing the asynchronous input signal ASYNCIN1 with the system clock is illustrated in FIG. 3 by a SYSCLK timing diagram 230 that represents the signal on the SYSCLK input line 112, an ASYNCIN1 timing diagram 232 that represents the signal on the ASYNCIN1 line 106, a Q1 timing diagram 234 that represents the signal on the Q1 signal line 214, and a SYNCOUT1 timing diagram 236 that represents the signal on the SYNCOUT1 signal line 124. In FIG. 3, the horizontal axis of each logic timing diagram represents time and the vertical axis represents the logic level (i.e., high H or low L) of the respective signal. The four timing diagrams 230, 232, 234, 236 are positioned in a vertical relationship to show the cause and effect relationship between the logic transitions in the corresponding four signals.

As illustrated by the timing diagram 230, the SYSCLK signal is a periodic signal that is typically referred to as a squarewave. In other words, in each cycle of the periodic signal, the signal spends approximately equal amounts of time at a high logic level and a low logic level. However, it should be understood that it is not necessary that the SYSCLK signal be a squarewave. For example, the SYSCLK signal can be a relatively short pulse at the high logic level, followed by a longer amount of time at the low logic level in each clock cycle. For purposes of the following discussion, it should be assumed that the beginnings of each clock period of the SYSCLK signal are the low-to-high signal transitions designated as 240, 241, 242 and 243 in FIG. 3.

As illustrated by the timing diagram 232, the asynchronous input signal ASYNCIN1 comprises a pulse that begins with a low-to-high logic level transition 250, has a stable high logic level portion 252 that lasts for at least one period of the SYSCLK signal, and ends with a high-to-low transition 254 back to the low logic level. The duration of the high logic level for at least one clock period is necessary in order to assure that the ASYNCIN1 signal is present at the D input of the first flip-flop 210 for at least one of the transitions 240-243 of the SYSCLK signal.

As further illustrated in FIG. 3, when the ASYNCIN1 signal has a high logic level when the SYSCLK signal has the low-to-high transitions 240-243, the Q1 signal on the line 214 changes to the logic level present on the ASYNCIN1 signal. Thus, since the first transition 240 of the SYSCLK signal occurs while the ASYNCIN1 signal is at a high logic level, the Q1 signal also changes to a high logic level as illustrated by a low-to-high signal transition 260 of the timing diagram 234. Because of the propagation delay through the first flip-flop 210, the low-to-high transition 260 of the Q1 signal occurs after the transition 240 of the SYSCLK signal. Thus, the Q1 signal changes too late to be clocked by the SYSCLK signal on the CLK input of the second flip-flop 212. Therefore, as illustrated by the SYNCOUT1 timing diagram 236, the SYNCOUT1 signal remains at a low logic level after the first transition 240 of the SYSCLK signal occurs.

The Q1 signal has a high logic level when the second low-to-high transition 241 of the SYSCLK signal occurs. Thus, the SYNCOUT1 signal will change from a low logic level to a high logic level as illustrated by a low-to-high transition 262 of the timing diagram 236. In the example illustrated in FIG. 3, the ASYNCIN1 signal remains at a high logic level until after the second transition 241 of the SYSCLK signal. Thus, the Q1 signal remains at a high logic level following the second transition 241 of the SYSCLK signal. It can be further seen that the high-to-low transition 254 of the ASYNCIN1 signal occurs between the second transition 241 and the third transition 242 of the SYSCLK signal. Thus, following the third transition 242, the Q1 signal will have a high-to-low transition 264. Thereafter, following the fourth transition 243 of the SYSCLK signal, the SYNCOUT1 signal will have a high-to-low signal transition 266.

From FIG. 3, it can be seen that the SYNCOUT1 signal is synchronized with the SYSCLK signal. Each transition in the SYNCOUT1 signal occurs a short propagation delay after one of the low-to-high transitions of the SYSCLK signal. Since other clocked logic signals within the computer system 100 (FIG. 1) are also synchronized with the SYSCLK signal, the SYNCOUT1 signal can be safely combined with the other logic signals without concern for a race condition.

Figure 4:
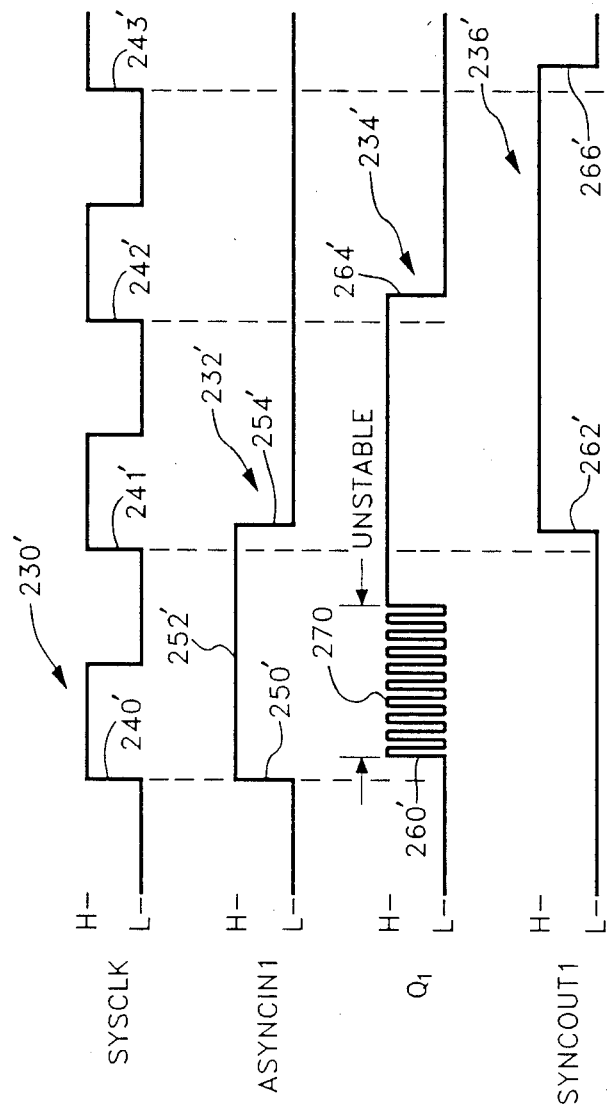
FIG. 4 illustrates the timing diagrams of FIG. 3 showing the oscillating output signals that may be generated by the first flip-flop when a race condition occurs as a result of failure to satisfy the setup and hold times of the first flip-flop and showing how the second flip-flop isolates the oscillating output signals.

It can be seen from FIG. 3, that the first flip-flop 210 synchronizes the Q1 signal with the SYSCLK signal. Although it may initially appear that the Q1 signal can be provided to the computer system 100 as a synchronized logic signal, it should be understood by one skilled in the art that the Q1 signal output from the first flip-flop 210 on the line 214 is not necessarily stable. This is illustrated in FIG. 4, wherein the SYSCLK timing diagram 230, is shown as before with transitions 240', 241', 242' and 243'. The timing of the ASYNCIN1 signal relative to the SYSCLK signal has changed and is illustrated by a timing diagram 232'. Similarly, the Q1 signal and the SYNCOUT1 signal are represented by timing diagrams 234' and 236', respectively. It should be understood that in FIG. 4, the same numbers are used for elements of the timing diagrams that correspond to the elements of FIG. 3 except that a prime (') has been added after each number.

In FIG. 4, the low-to-high transition 250' of the ASYNCIN1 signal occurs at substantially the same time as the first low-to-high transition 240' of the SYSCLK signal As is well known in the art, a D flip-flop, such as the first flip-flop 210, has minimum setup and hold times in order to assure proper operation of the flip-flop When the setup and hold time requirements are not met, the outputs of the flip-flop 210 are temporarily unstable as illustrated by an unstable portion 270 of the Q1 signal timing diagram 234' in FIG. 4. It can be seen that the Q1 signal oscillates (i.e., rapidly varies from a high level to a low level and vice versa) for a time period labeled as "UNSTABLE". After this period of instability, the Q1 signal will stabilize at the appropriate logic level (i.e., the high logic level). Although not illustrated in FIG. 4, a similar instability can occur when the ASYNCIN1 signal has a high-to-low transition that occurs at substantially the same time as one of the low-to-high transition of the SYSCLK.

It can be seen in FIG. 4 that, so long as the unstable portion of the Q1 signal does not last significantly longer than one-half the period of the SYSCLK signal, the Q1 signal is stable at the second low-to-high transition 241' of the SYSCLK signal such that the required setup and hold times are met for the D input of the second flip-flop 212. Thus, the low-to-high logic transition 262' of the SYNCOUT1 signal does not exhibit any of the instability of the Q1 signal, and the SYNCOUT1 signal is successfully synchronized with the SYSCLK signal.

Figure 5:
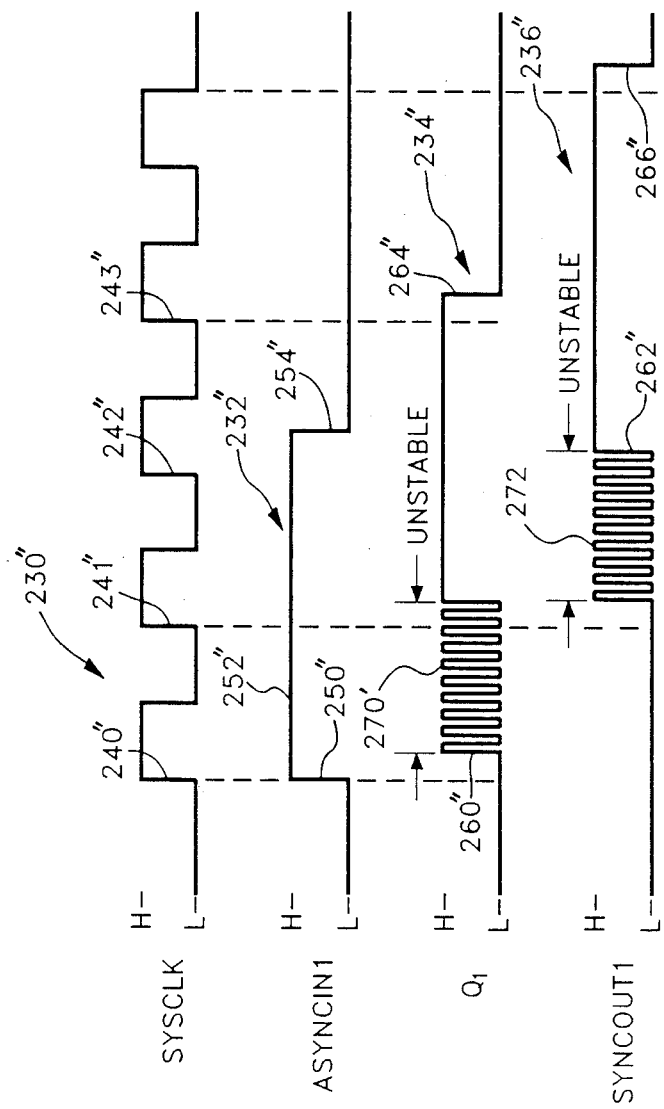
FIG. 5 illustrates the timing diagrams of FIG. 4 when the frequency of the internal time base clock is sufficiently high that the periodicity of the internal time base clock is less than the settling time of the first flip-flop such that the second flip-flop is clocked while the output of the first flip-flop is oscillating.

The series connected flip-flops of FIG. 2 are adequate for many purposes. However, as the frequency of the internal time base of the computer system 100 is increased, thus reducing the period of the SYSCLK signal, the unstable portion 270 of the Q1 signal can result in an unstable SYNCOUT1 signal. This condition is illustrated in FIG. 5. In FIG. 5, the same numbers are used for elements of the timing diagrams that correspond to the elements of FIGS. 3 and 4 except that a double prime (″) has been added after each number.

In FIG. 5, the timing diagram 230″ illustrates the SYSCLK signal operating at a higher frequency than in FIGS. 3 and 4. The timing diagram 232″ illustrates the ASYNCIN1 signal with the low-to-high transition 250″ being substantially coincident with the first low-to-high transition 240″ of the SYSCLK signal such that the setup and hold time requirements of the first flip-flop 210 are not met. Thus, as illustrated by the timing diagram 234″, the Q1 signal has a period of instability that lasts for approximately the same time as in FIG. 4. However, in FIG. 5, the period of the SYSCLK signal is considerably shorter such the unstable portion 270, of the Q1 signal lasts until after the occurrence of the second transition 241″ of the SYSCLK signal. Because of the rapidly changing logic levels of the Q1 signal when the second transition 241″ of the SYSCLK signal occurs, there is a substantial probability that the level of the Q1 signal will not meet the setup and hold requirements of the second flip-flop 212. Thus, as illustrated by the timing diagram 236″, representing the SYNCOUT1 signal, there is a substantial probability that the SYN-COUT1 signal will have an unstable portion 272. Although a temporarily unstable output was acceptable in the Q1 signal in FIG. 4, it is not acceptable in the SYN-COUT1 signal because the SYNCOUT1 signal is provided to other clocked logic circuits in the computer system 100. Thus, a need exists to be able to synchronize an asynchronous input signal with a system clock operating at a higher frequency.

One solution that has been considered to solve the above-described problem is to synchronize the asynchronous input signal with a clock signal derived from the system clock signal, but operating at a lower data rate. Although this solution would have the same effect as the operation of the first and second flip-flops 210, 212 in accordance with the timing diagrams of FIG. 4, it should be understood that the resulting signal would be synchronized with the derived clock signal rather than the system clock signal. Since the derived signal will be delayed with respect to the system clock signal, the synchronized input signal may not be readily introduced into logic circuits wherein the other signals are synchronized directly with the system clock signal. This is particularly true in computer systems wherein the period of the system clock is not significantly greater than the propagation delays from a transition in the clock of a flip-flop to transitions in the flip-flop outputs. Thus, using a slower clock signal derived from the system clock signal is not an acceptable solution in some computer systems, and a need continues to exist for a synchronization circuit that operates with a high frequency system clock signal.

Figure 6:
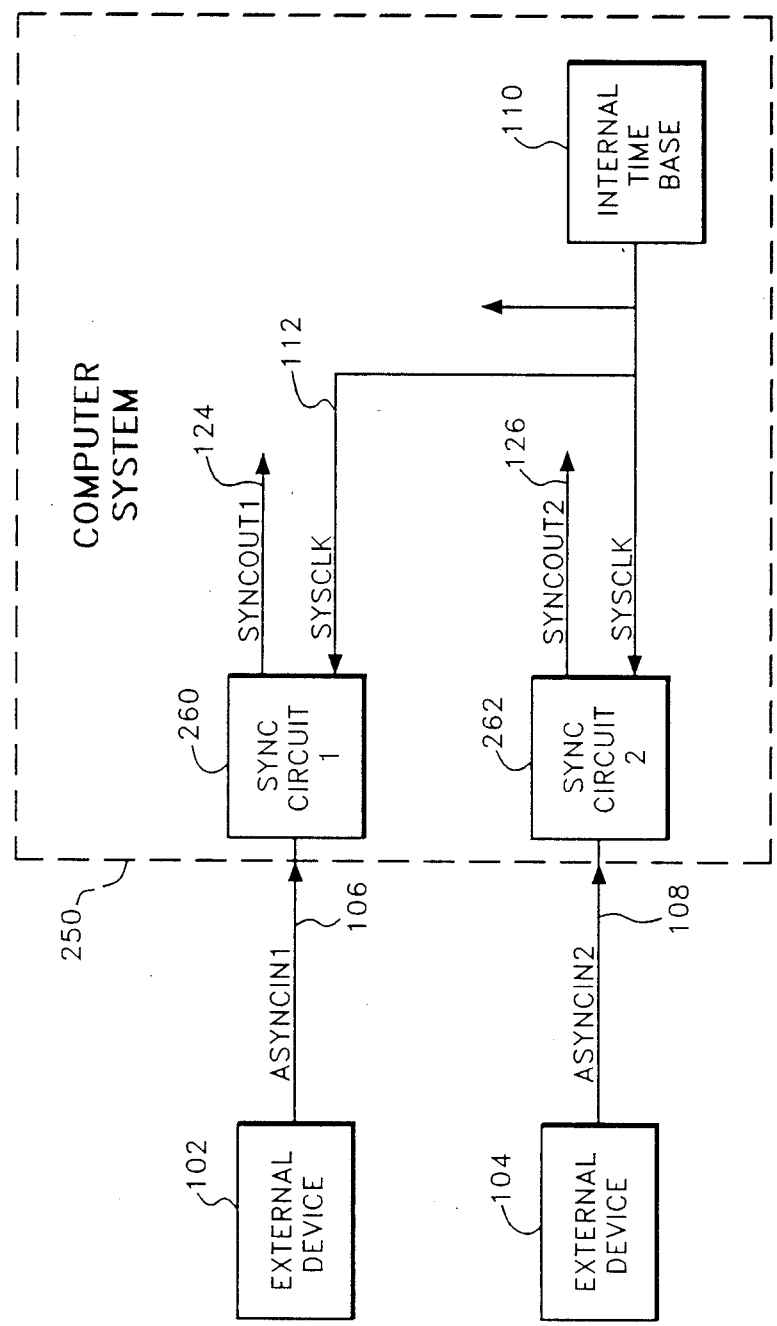
FIG. 6 illustrates an exemplary computer system incorporating the synchronization circuit of the present invention.

The foregoing problems are solved in the present invention, as illustrated in FIGS. 6–11. FIG. 6 illustrates a computer system 250 that is similar to the computer system 100 of FIG. 1 except that it includes improved synchronization circuits 260 and 262 in place of the prior art synchronization circuits 120 and 122 of the computer system 100. Other than the improved synchronization circuits 260, 262, the computer system 250 of FIG. 6 has the elements of FIG. 1 and the like elements have the same numeric designators and descriptive labels.

Figure 7:
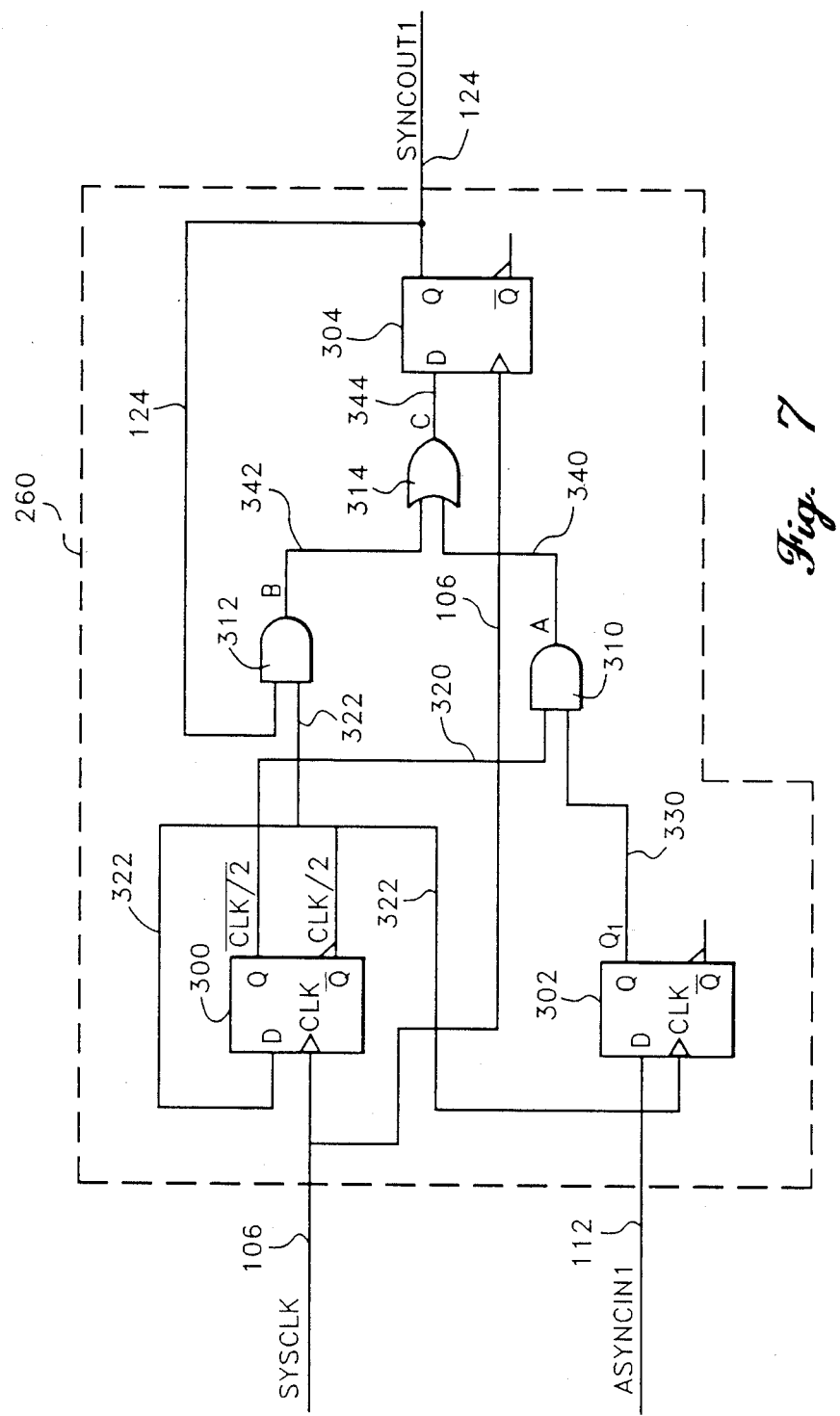
FIG. 7 illustrates a logic diagram of an exemplary improved synchronization circuit of the present invention wherein the output signal of the synchronization circuit is stable irrespective of whether the asynchronous input signal satisfies the setup and hold times to the first flip-flop of the synchronization circuit.

FIG. 7 illustrates a logic diagram of the improved synchronization circuit 260 of the present invention that can be incorporated into the computer system 250 of FIG. 6 and which solves the above-described problems with the prior art system. As will be described below, the synchronization circuit 260 of FIG. 7 provides an ASYNCOUT1 signal on the line 124 that is synchronized directly with the high frequency system clock SYSCLK and which does not exhibit the unstable condition described above in connection with FIG. 4.

The synchronization circuit of FIG. 7 includes a first, second and third clocked flip-flops 300, 302, 304, which are preferably D-type flip-flops, each having a D input, a CLK input, a Q output and a $\overline{Q}$ output, as described above in connection with FIG. 2.

The SYSCLK signal is provided as the input to the CLK inputs of the first flip-flop 300 and the third flip-flop 302 via the SYSCLK signal line 106. The ASYN-CIN1 signal is provided as the input to the D input of the second flip-flop 302 via the input line 114. The SYN-COUT1 signal is generated as the output from the Q output of the third flip-flop 304 on the ASYNCOUT1 signal line 124.

The synchronization circuit 260 of FIG. 7 further includes a first AND-gate 310, a second AND-gate 312 and an OR-gate 314, each having a first input, a second input and an output. The Q output of the first flip-flop 300 is a CLK/2 signal which is connected to the first input of the first AND-gate 310 via a signal line 320. The $\overline{Q}$ output of the first flip-flop 300 is a $\overline{CLK/2}$ signal which is connected to the first input of the second AND-gate 312 via a signal line 322. The CLK/2 signal is further connected to the D input of the first flip-flop 300 and to the CLK input of the second flip-flop 302.

The Q output of the second flip-flop 302 is a Q1 signal which is connected to the second input of the first AND-gate 310 via a signal line 330. The SYNCOUT1 signal on the signal line 124 is connected to the second input of the second AND-gate 312.

The output of the first AND-gate 310 is a signal A and is connected to the first input of the OR-gate 314 via a signal line 340. The output of the second AND-gate 312 is a signal B and is connected to the second input of the OR-gate 314 via a signal line 342. The output of the OR-gate 314 is a signal C and is connected to the D input of the third flip-flop 304 via a signal line 344.

Preferably, the three flip-flops 300, 302, 304 and the three gates 310, 312, 314, are embodied in a PAL circuit wherein at least a portion of the interconnections are formed by programming the PAL circuit.

Figure 8:
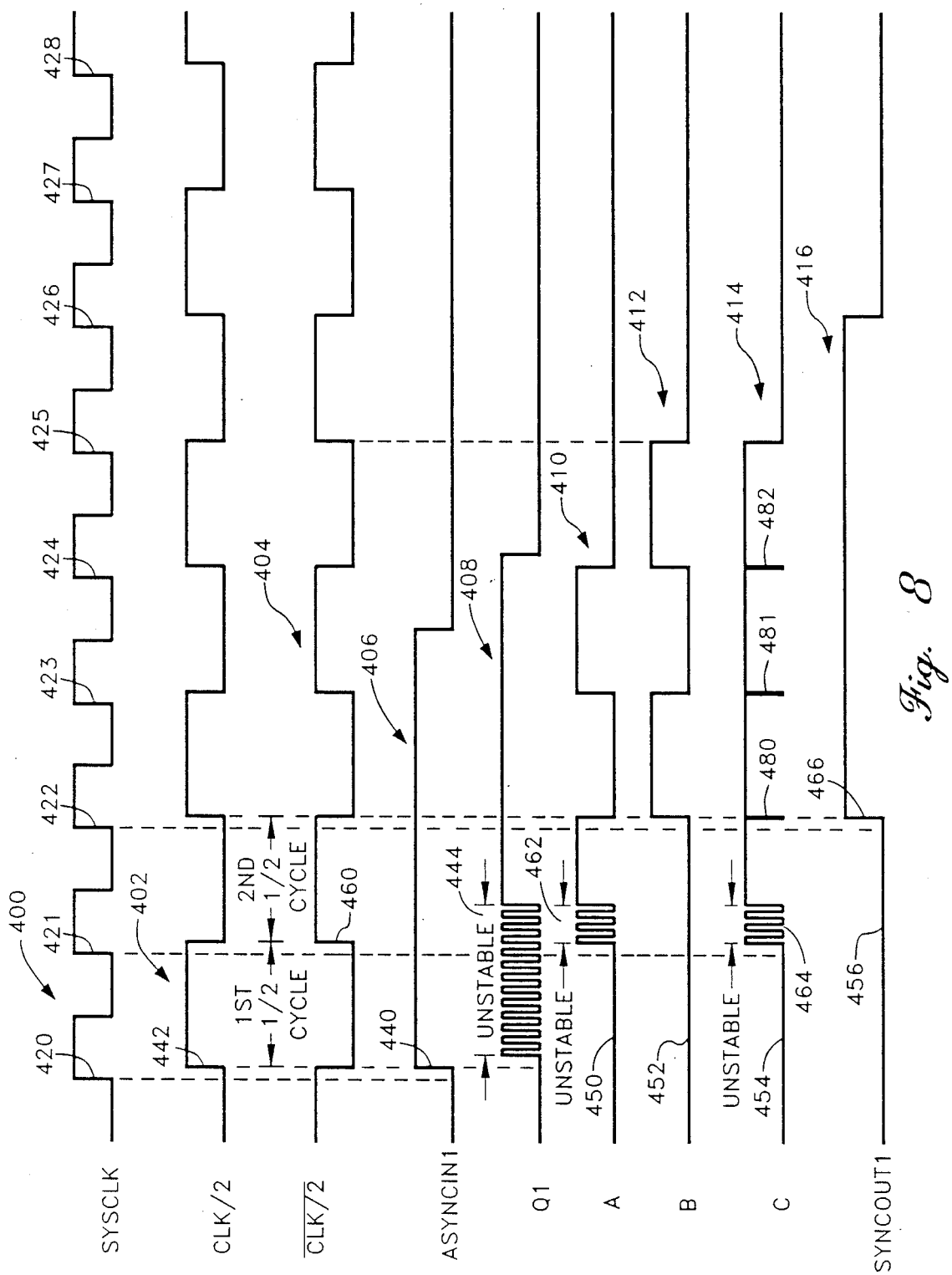
FIG. 8 illustrates exemplary timing diagrams associated with the improved synchronization circuit of FIG. 7 showing the operation of the present invention to synchronize an asynchronous input signal having a low-to-high transition coincident with the low-to-high transition of the clocking signal.

The operation of the synchronization circuit 300 can be understood by referring to the timing diagrams in FIG. 8. A timing diagram 400 represents the SYSCLK signal on the signal line 106. A timing diagram 402 represents the CLK/2 signal. A timing diagram 404 represents the $\overline{CLK/2}$ signal. A timing diagram 406 represents the ASYNCIN1 signal on the input line 112. A timinq diagram 408 represents the Q1 signal. A timing diagram 410 represents the A signal on the output of the first AND-gate 310. A timing diagram 412 represents the B signal on the output of the second AND-gate 312. A timing diagram 414 represents the C signal on the output of the OR-gate 314. A timing diagram 416 represents the SYNC1OUT signal generated on the signal line 124 by the third flip-flop 304.

The SYSCLK timing diagram 400 includes a plurality of low-to-high transitions 420–428 which are the clocking transitions for the first flip-flop 300 and the third flip-flop 304. As illustrated by the timing diagram 402, the CLK/2 signal has a frequency that is one-half the frequency of the SYSCLK signal and has transitions that occur a short time after the low-to-high transitions 420–428 of the SYSCLK signal. The $\overline{CLK/2}$ signal is complementary to the CLK/2 signal and thus has low-to-high transitions when the CLK/2 signal has high-to-low transitions. Thus, the first flip-flop 300 operates as a clock generator that generates a clock signal having a frequency that is less than the frequency of the SYSCLK signal.

For the purposes of this description, it is assumed that the ASYNCIN1 signal has a low-to-high transition 440 that occurs substantially coincident to a low-to-high transition 442 of the CLK/2 signal. Thus, since the CLK/2 signal clocks the second flip-flop 302, the setup and hold time requirements for the second flip-flop 302 are not met, and the Q1 signal on the Q output of the second flip-flop 302 will oscillate during an unstable period 444, as illustrated in the timing diagram 408. It can be seen that in the example presented, the unstable period 444 of the Q1 signal has a duration greater than one cycle of the SYSCLK signal and thus greater than one-half cycle of either the CLK/2 signal or the $\overline{CLK/2}$ signal. However, the unstable period has a duration that is less than one cycle of either the CLK/2 signal or the $\overline{CLK/2}$ signal.

The Q1 signal is AND'ed with the $\overline{CLK/2}$ signal by the AND-gate 310 to produce the signal A at the output of the AND-gate 310. As illustrated by a low logic portion 450 in the timing diagram 410, the $\overline{CLK/2}$ signal is inactive low during the first portion of the unstable period of the Q1 signal (i.e., during the first half-cycle of $\overline{CLK/2}$ signal following the transition 454 of the CLK/2 signal). Thus, the output of the AND-gate 310 is also low during this first half-cycle. During this first half-cycle, the CLK/2 signal provided to the AND-gate 312 has a logic high level to enable the AND-gate 312. The other input of the AND-gate 312 is the SYNCOUT1 signal from the third flip-flop 304, which is at a low logic level since the ASYNCIN1 signal was previously at a low logic level. Thus, the B signal will have a low logic level as indicated at a location 452 of the timing diagram 412. Since the output signal B of the second AND-gate 312 is connected to one input of the OR-gate 314, the C signal on the output of the OR-gate 314 will have the same logic level as the current logic level of the SYNCOUT1 signal as indicated at a location 454 of the timing diagram 414. Thus, the current logic level of the SYNCOUT1 signal will be clocked into the third flip-flop 304 at the second low-to-high transition 421 of the SYSCLK signal, and the SYNCOUT1 signal will remain at a low logic level as indicated at a location 456 of the timing diagram 416.

It can be seen that the CLK/2 signal and the second AND-gate 312 operate to maintain the current logic level of the SYNCOUT1 signal during this first half-cycle, while the $\overline{CLK/2}$ signal blocks the unstable logic levels of the Q1 signal from reaching the input of the third flip-flop 304.

At the end of this first half-cycle, as indicated by a low-to-high transition 460 in the $\overline{CLK/2}$ signal timing diagram 404, the AND-gate 310 is enabled by the active high logic level of the $\overline{CLK/2}$ signal, and the signal A on the output of the AND-gate 310 will track the Q1 signal for the second half-cycle of the CLK/2 and $\overline{CLK/2}$ signals. The beginning of this second half-cycle includes the remainder of the unstable period of the Q1 signal, as indicated by an unstable portion 462 of the A timing diagram 410. During this second half-cycle, the CLK/2 signal has a low logic level to disable the second AND-gate 312. Thus, the C signal on the output of the OR-gate 314 will now track the Q1 signal output and will include a short unstable portion 464 caused by the unstable portion of the Q1 signal that lasts longer than the first half-cycle of the CLK/2 and $\overline{CLK/2}$ signals Since the CLK/2 signal changes to the high logic level after the second transition 421 in the SYSCLK signal, the unstable portion of the C signal does not occur in time to be clocked by the transition 421 in the SYSCLK signal. Rather, the previous logic level (i.e., low logic level) of the ASYNC1OUT signal is clocked into the third flip-flop 304, as discussed above.

The duration of the full cycle of the CLK/2 and $\overline{CLK/2}$ signals is selected so that the Q1 signal will become stable early in the second half-cycle as shown in FIG. 8. Thus, when the third low-to-high transition 422 of the SYSCLK signal occurs, the C signal will have been stable for a sufficiently long time that the C signal meets the setup and hold requirements for the third flip-flop 304. Thus, when the third transition 422 occurs, the high logic level on the C signal will be clocked into the third flip-flop 304, and, after a short propagation delay, will appear on the Q output of the third flip-flop 304 as a high logic level on the SYNCOUT1 signal, as indicated by a low-to-high transition 466 of the timing diagram 416.

While the ASYNCIN1 signal remains at a high logic level, the first AND-gate 310 will continue to gate the logic high Q1 signal to the OR-gate 314 and thus to the input of the third flip-flop 304 when the $\overline{CLK/2}$ signal has a high logic level (i.e., during the second half-cycles of the CLK/2 and $\overline{CLK/2}$ signals), and the second AND-gate 312 will continue to gate the SYNCOUT1 signal to the OR-gate 314 and thus to the input of the third flip-flop 314 when the CLK/2 signal has a high logic level (i.e., during the first half-cycles of the CLK/2 and $\overline{CLK/2}$ signals). Since both the Q1 signal and the SYNCOUT1 signal are high, a high logic signal will continue to be gated into the third flip-flop 304 to maintain the SYNCOUT1 signal at a high logic level. Although the C signal may include a plurality of short high-to-low-to high transient signals 480, 481, 482 caused by the timing relationship between the disablement of one of the AND-gates 310, 312 and the enablement of the other of the AND-gates 310, 312. It can be seen that each of the transient signals 480–482 occurs shortly after a corresponding one of the low-to-high transitions 422–424 of the SYSCLK signal and well before the next following low-to-high transitions of the SYSCLK signal. Thus, the transient signals 480–482 do not present a problem with respect to the required setup and hold times of the third flip-flop 304.

Figure 9:
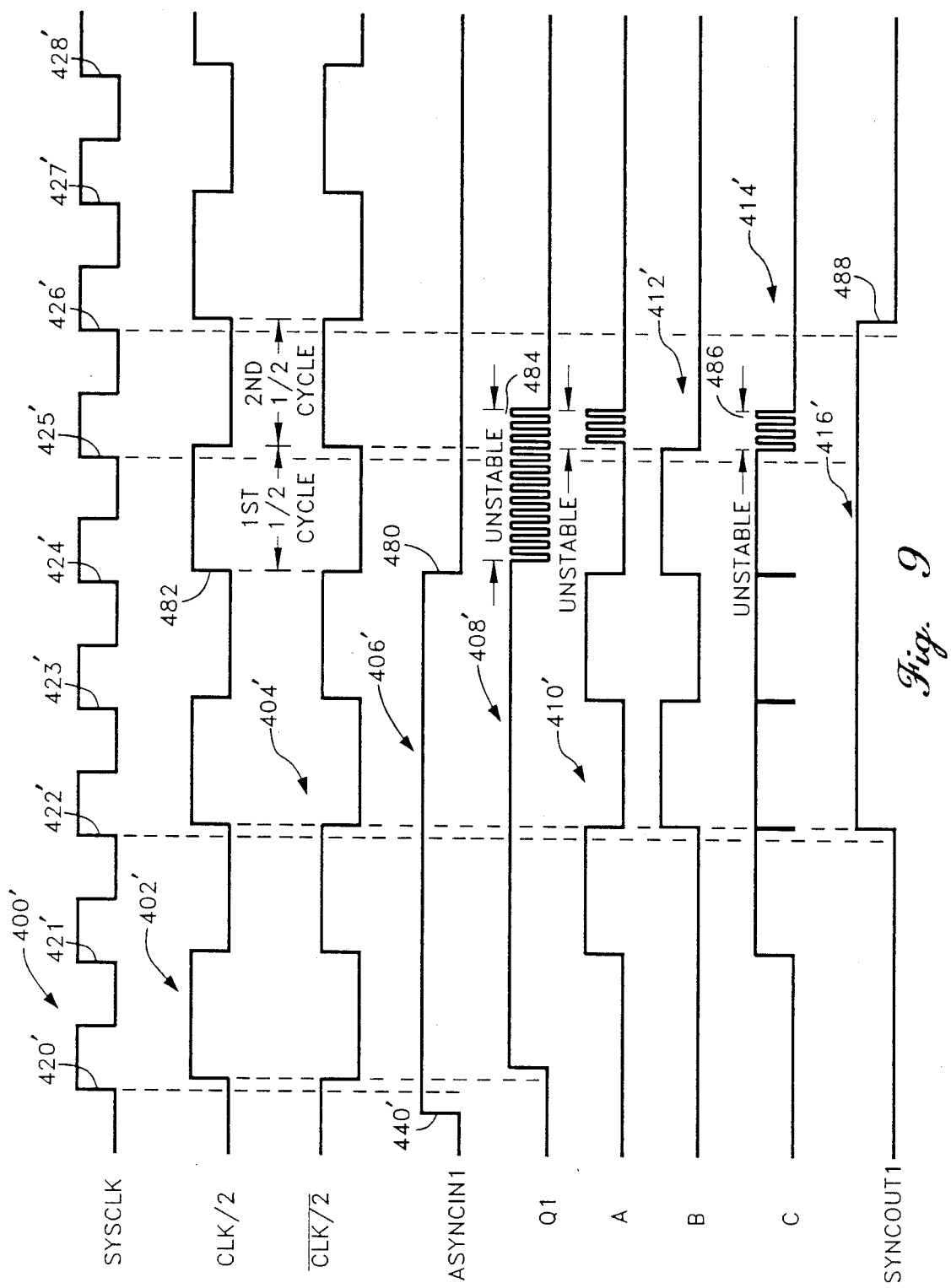
FIG. 9 illustrates exemplary timing diagrams associated with the improved synchronization circuit of FIG. 7 showing the operation of the present invention to synchronize an asynchronous input signal having a high-to-low transition coincident with the low-to-high transition of the clocking signal.

FIG. 9 illustrates the same timing diagrams as in FIG. 8 with the numbers indicating the elements shown in FIG. 8 having a prime as a suffix (i.e., 400', 402', etc.). In FIG. 9, the ASYNCIN1 signal arrives at the D input of the second flip-flop 302 at a time with respect to the SYSCLK signal such that a high-to-low transition 480 of the ASYNCIN1 signal is coincident with a low-to-high transition 482 of the CLK/2 signal. When this occurs, the Q1 signal has an unstable period 484 during a first half-cycle of the CLK/2 and $\overline{\text{CLK/2}}$ signals following the low-to-high transition 482. As before, the unstable portion 484 of the Q1 signal is blocked through the first AND-gate 310, and the current high logic level state of the SYNCOUT1 signal is maintained by the second AND-gate 312 until the end of this first half-cycle. Thus, the high logic level of the SYNCOUT1 signal is maintained following the low-to-high transition 425' of the SYSCLK that occurs during this first half-cycle. During the second half-cycle of the CLK/2 and $\overline{\text{CLK/2}}$ signals, the Q1 signal is gated through the first AND-gate 310 and the OR-gate 314 as the C signal input to the D input of the third flip-flop 304 and may have an unstable portion 486, as shown. By the time the next occurring low-to-high transition 426' occurs, the C signal will have stabilized so that the setup and hold time requirements of the third flip-flop 304 are met. Thus, the SYNCOUT1 signal will change from a high logic level to a low logic level, as indicated by a transition 488, without any unstable transitions.

From the foregoing, it can be seen that the synchronization circuit 260 of the present invention eliminates the potential race conditions caused by the low-to-high transition or the high-to-low transition of the asynchronous input signal ASYNCIN1 being coincident with the clocking signal CLK/2. At the same time, the synchronization circuit 260 assures that the synchronized output signal SYNCOUT1 is synchronized with the system clock SYSCLK rather than the lower frequency CLK/2. Thus, the SYNCOUT1 signal can be readily combined with other clocked logic signals in the computer system 250 (FIG. 6) without having to compensate for the additional delay that would be incurred if the SYNCOUT1 signal were synchronized with the lower frequency CLK/2 signal or some other signal derived from the SYSCLK signal.

Figure 10:
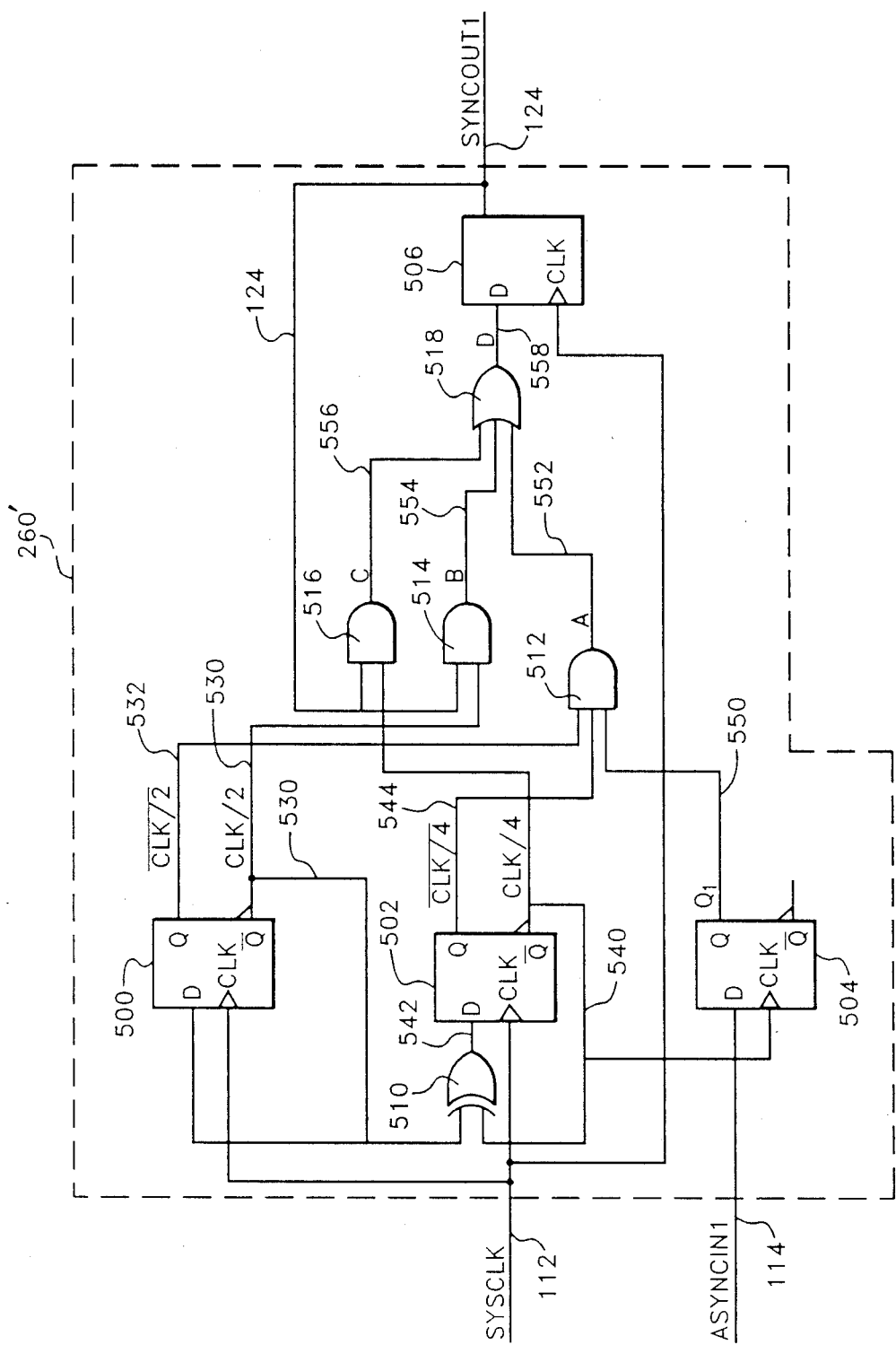
FIG. 10 illustrates a logic diagram of an alternative embodiment of the improved synchronization circuit of the present invention showing the modification to allow a higher frequency internal time base clock.

If the SYSCLK signal is increased to a still higher frequency to achieve higher data transfer rates, the synchronization circuit 260 of FIG. 7 can be modified to accommodate the increased clock frequency, as illustrated by a further embodiment of the synchronization circuit 260' in FIG. 10. The synchronization circuit 260' includes a first flip-flop 500, a second flip-flop 502, a third flip-flop 504 and a fourth flip-flop 506. The four flip-flops 500, 502, 504, 506 are preferably D-type flip-flops, each having a D input, a CLK input, a Q output and a $\overline{\text{Q}}$ output. The Q output of the fourth flip-flop 504 is the SYNCOUT1 signal on the SYNCOUT1 output line 124.

The circuit of FIG. 10 further includes an exclusive-OR gate 510, a first AND-gate 512 having first, second and third inputs and an output, a second AND-gate 514 having first and second inputs and an output, a third AND-gate 516 having first and second inputs and an output, and an OR-gate 518 having first, second and third inputs and an output.

The first flip-flop 500 corresponds to the first flip-flop 300 of FIG. 7 and has its clock input CLK connected to the SYSCLK line 112. The D input of the first flip-flop 500 is connected to the $\overline{\text{Q}}$ output of the first flip-flop 500 via a CLK/2 signal line 530 so that the first flip-flop 500 toggles on every low-to-high transition and generates a CLK/2 signal on the CLK/2 signal line 530. The first flip-flop 500 generates a $\overline{\text{CLK/2}}$ signal on a $\overline{\text{CLK/2}}$ signal line 532 connected to its Q output that is complementary to the CLK/2 signal. The CLK/2 and $\overline{\text{CLK/2}}$ signals have a frequency that is one-half the frequency of the SYSCLK signal on the SYSCLK input line 112.

The $\overline{\text{CLK/2}}$ signal line 532 is connected to the first input of the first AND-gate 512. The CLK/2 signal line 530 is connected to the first input of the second AND-gate 514 and to the first input of the exclusive-OR gate 510. The second input of the exclusive-OR gate 510 is connected to the $\overline{\text{Q}}$ output of the second flip-flop 502 via a CLK/4 signal line 540. The output of the exclusive-OR gate 310 is connected to the D input of the second flip-flop 502 via a signal line 542. The CLK input of the second flip-flop 502 is connected to the SYSCLK signal input line 112. The operation of the exclusive-OR gate 310 in combination with the first and second flip-flops 500, 502 is such that the $\overline{\text{Q}}$ output of the second flip-flop on the CLK/4 signal line 540 has a frequency that is one-fourth the frequency of the SYSCLK signal and has transitions that occur at substantially the same time as the low-to-high transitions of the CLK/2 signal. The Q output of the second flip-flop 502 is a $\overline{\text{CLK/4}}$ signal on a $\overline{\text{CLK/4}}$ signal line 544. The $\overline{\text{CLK/4}}$ signal is complementary to the CLK/4 signal. It can be seen that the first and second flip-flops 500, 504 operate as a clock generator that generate clock signals having frequencies that are less than the frequency of the SYSCLK signal.

The CLK/4 signal line 540 is connected to the first input of the third AND-gate 516 and to the CLK input of the third flip-flop 504. The $\overline{\text{CLK/4}}$ signal line 544 is connected to the second input of the first AND-gate 512.

The D input of the third flip-flop 504 is connected to the ASYNCIN1 signal on the ASYNCIN1 input line 114. The Q output to the third flip-flop 504 is a Q1 signal and is connected to the third input of the first AND-gate 512 via a Q1 signal line 550.

The output of the first AND-gate 512 is an A signal on an A signal line 552 which is connected to the first input of the OR-gate 518. The second inputs of the second AND-gate 514 and the third AND-gate 516 are connected to the SYNCOUT1 signal line 124 and thus to the Q output of the fourth flip-flop 504. The output of the second AND-gate 514 is a B signal on a B signal line 554 which is connected to the second input of the OR-gate 518. The output of the third AND-gate 516 is a C signal on a C signal line 556 which is connected to the third input of the OR-gate 518. The output of the OR-gate 518 is a D signal on a D signal line 558 which is connected to the D input of the fourth flip-flop 504. The CLK input of the fourth flip-flop 504 is connected to the SYSCLK signal via the SYSCLK signal line 112.

Figure 11:
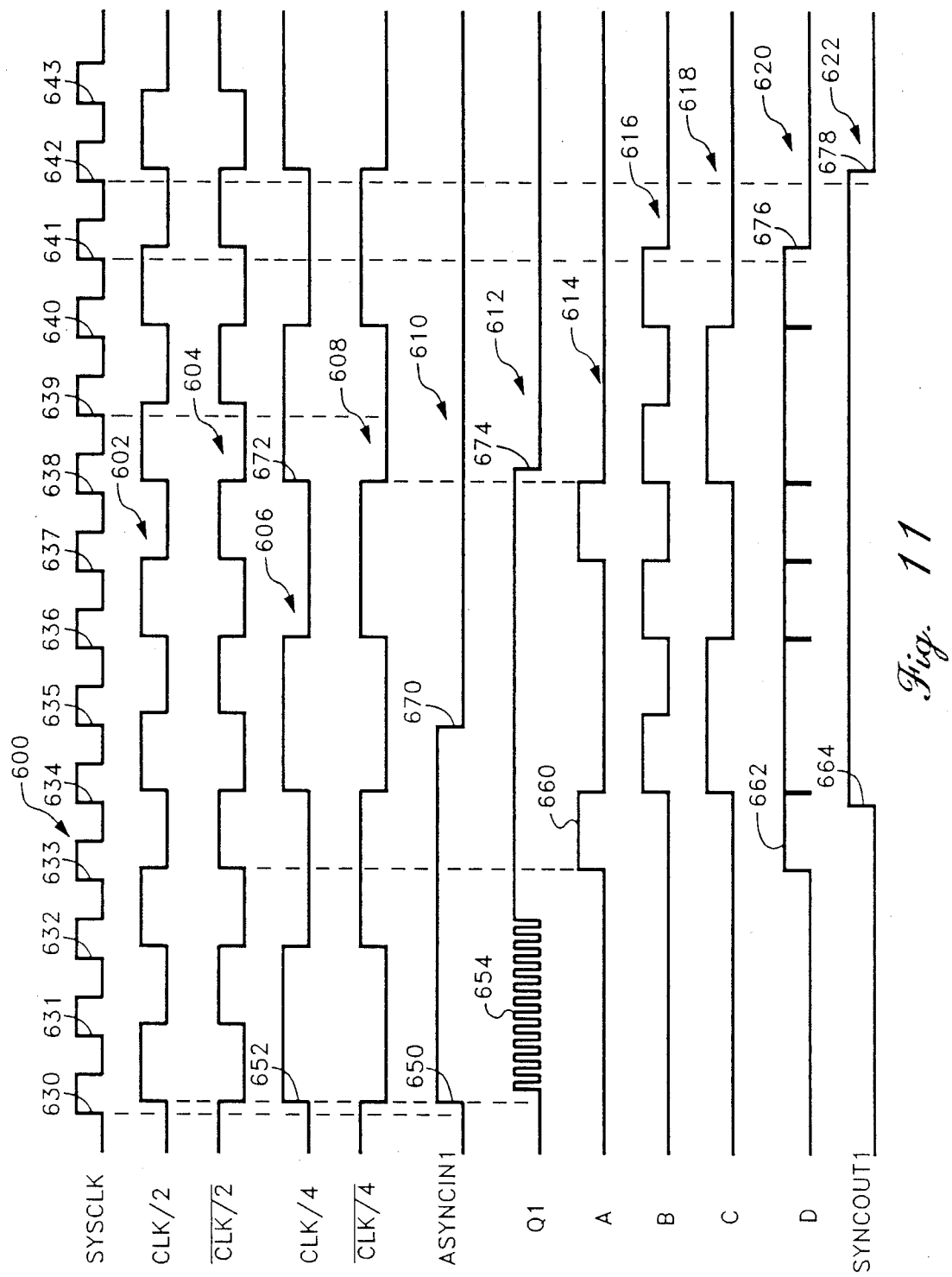
FIG. 11 illustrates exemplary timing diagrams associated with the synchronization circuit of FIG. 10.

The operation of the embodiment of FIG. 10 in providing the synchronized output signal SYNCOUT1 is illustrated by the timing diagrams in FIG. 11. Timing diagrams 600, 602, 604, 606, 608, 610, 612, 614, 616, 618, 620 and 622 represent the SYSCLK signal, the CLK/2 signal, the $\overline{\text{CLK/2}}$ signal, the CLK/4 signal, the $\overline{\text{CLK/4}}$ signal, the ASYNCIN1 signal, the Q1 signal, the A signal, the B signal, the C signal, the D signal, and the SYNCOUT1 signal, respectively. As illustrated, the SYSCLK signal has a plurality of low-to-high transitions 630–643. The CLK/2 and $\overline{\text{CLK/2}}$ signals have alternating low-to-high and high-to-low transitions that are delayed from the low-to-high transitions 630–643 of the SYSCLK signal. The CLK/4 and $\overline{\text{CLK/4}}$ signals have low-to-high and high-to-low transitions that are substantially coincident with the low-to-high transitions of the CLK/2 signal.

The exemplary ASYNCIN1 signal is illustrated to have a low-to-high transition 650 that is substantially coincident with a first low-to-high transition 652 of the CLK/4 signal. Thus, the setup and hold time requirements of the third flip-flop 504 are not met, and the Q1 output of the third flip-flop 504 has an unstable period 654. Because of the high frequency of the SYSCLK signal, the duration of the unstable period 654 is greater than the duration of one-cycle of the CLK/2 signal. Thus, the circuit of FIG. 7 would not operate properly at this higher frequency SYSCLK signal. However, in the embodiment of FIG. 11, the Q1 signal is not enabled through the first AND-gate 512 until the coincidence of a high logic level of the CLK/4 and the CLK/2 signal. This coincidence does not occur until well after the end of the unstable period 654 of the Q1 signal. Thus, the A signal output becomes stable at a high logic level, as illustrated at a location 660, when the CLK/2 signal changes to a high logic level shortly after the fourth low-to-high transition 633 of the SYSCLK signal. Until after this fourth transition 633, the D signal output of the OR-gate 518 is maintained at the previous low logic level of the SYNCOUT1 signal via the B signal output of the second AND-gate 514 and the C signal output of the third AND-gate 516. The D signal output of the OR-gate 518 will change to a high logic level, as indicated at a location 662, in response to the change in the A signal. This high logic level will be clocked into the fourth flip-flop 506 at the fifth transition 634 and will appear on the SYNCOUT1 signal line 124, as indicated by a low-to-high transition 664, after the propagation delay through the fourth flip-flop 506. Thus, it can be seen that the SYNCOUT1 signal is a stable output signal that is synchronized directly with the SYSCLK signal.

As illustrated, the SYSCLK signal will remain at a logic high level until after the ASYNCIN1 signal line returns to a low logic level via a high-to-low transition 670. The low logic level is clocked into the third flip-flop via a low-to-high transition 672 of the CLK/4 signal to cause the Q1 signal to change after a short propagation delay through the third flip-flop 504, as illustrated by a high-to-low transition 674. However, the previous high logic level of the SYNCOUT1 signal is maintained via the second AND-gate 514, the third AND-gate 516 and the OR-gate 518 until after the transition 641 of the SYSCLK signal, at which time the D signal output of the OR-gate 518 goes switches to a low logic level via a transition 676. Thereafter, a low logic level on the D signal output of the OR-gate 518 is clocked into the fourth flip-flop 506 by the next occurring transition 642 of the SYSCLK signal so that the SYNCOUT1 signal on the line 124 changes shortly thereafter, as illustrated by a transition 678. Thus, the high-to-low transition of the SYNCOUT1 signal is synchronized directly with the SYSCLK signal.

Although not illustrated herein, it should be understood that the circuit of FIG. 10 will also synchronize the high-to-low transitions of the ASYNCIN1 signal when it is coincident with the low-to-high transition of the CLK/4 signal.

One skilled in the art will appreciate that still further modifications to the above-described circuits of the present invention can be made to accommodate still higher clock frequencies. These and other modifications to the present invention can be made within the scope and spirit of the present invention as defined in the claims appended hereto.

What is claimed is:

1. A synchronization circuit that synchronizes an asynchronous input signal having first and second logic levels with a high frequency system clock signal using clocked logic circuits having minimum required setup and hold times for data input signals, said synchronization circuit comprising:

a clock generator that generates a first clock signal having a frequency less than the frequency of said system clock;

a first clocked logic circuit having a clock input terminal connected to receive said first clock signal from said clock generator, a data input terminal that receives said asynchronous input signal, and a data output terminal, said first clocked logic circuit responsive to a predetermined logic level transition of said first clock signal to provide a first output signal on said data output terminal that has a logic level responsive to the logic level of said asynchronous input signal when said predetermined logic level transition of said first clock signal occurs, said logic level of said first output signal having an unstable logic level when said logic level of said asynchronous input signal changes too close in time to said predetermined logic level transition of said first clock signal;

a second clocked logic circuit having a clock input terminal, a data input terminal that is responsive to a data input signal having two logic levels, and a data output terminal that provides a data output signal having two logic levels, said clock input terminal of said second clocked logic circuit connected to receive said system clock signal, said second clocked logic circuit responsive to a predetermined transition of said system clock signal to provide a second output signal on said data output terminal responsive to the logic level of said data input signal on said data input terminal, said second output signal synchronized with said system clock signal; and a logic circuit, interposed between the data output terminal of said first clocked logic circuit and said data input terminal of said second clocked logic circuit, that receives said first output signal and generates said data input signal to said second clocked logic circuit, said logic circuit enabling said data input signal to said second clocked logic circuit to change only at a time that is sufficiently spaced apart from said predetermined transition of said system clock signal so that the said minimum required setup and hold times of said second clocked logic circuit are satisfied, thereby preventing said second output signal from being unstable.

2. The synchronization circuit as defined in claim 1, wherein said clock generator comprises a divide-by-two circuit that generates said first clock signal having a frequency one-half the frequency of said system clock signal.

3. The synchronization circuit as defined in claim 1, wherein said clock generator comprises a divide-by-two circuit that generates a second clock signal having a frequency one-half the frequency of said system clock signal, and a second divide-by-two circuit that generates said first clock signal having a frequency one-half the frequency of said second clock signal.

4. The synchronization circuit as defined in claim 1, wherein said first and second clocked logic circuits are flip-flops.

5. The synchronization circuit as defined in claim 1, wherein said first clock signal has first and second half cycles and wherein said logic circuit comprises:
- a first gate that enables said first output signal from said data output terminal of said first clocked logic circuit to said data input terminal of said second clocked logic circuit during one of said first and second half cycles of said first clock signal; and
- a second gate that enables said second output signal from said data output terminal of said second clocked logic circuit to said data input terminal during the other of said first and second half cycles.

6. The synchronization circuit as defined in claim 1, wherein:
- said first clock signal has first and second half cycles, said first half cycle comprising first and second quarter cycles, said second half cycle comprising third and fourth quarter cycles;
- said predetermined logic level transition of said first clock signal occurs at the beginning of said first quarter cycle; and
- said logic circuit comprises gating logic that enables said first output signal from said data output terminal of said first clocked logic circuit to said data input terminal of said second clocked logic circuit during said fourth quarter cycle, and enables said second output signal from said data output terminal of said second clocked logic circuit during said first, second and third quarter cycles.

7. A synchronization circuit for synchronizing an asynchronous input signal having first and second logic levels with a high frequency system clock signal, comprising:
- means for generating an intermediate clocking signal having a frequency less than the frequency of said system clock signal, said intermediate clocking signal including a predetermined signal transition at the beginning of each cycle of said intermediate clocking signal;
- a first clocked logic circuit having a clock input terminal that receives said intermediate clocking signal, having a data input terminal that receives said asynchronous input signal, and having a data output terminal, said first clocked logic circuit generating a first output signal on said data output terminal responsive to the logic level of said asynchronous input signal when said predetermined signal transition of said intermediate clocking signal occurs;
- a second clocked logic circuit having a clock input terminal that receives said system clock signal, having a data input terminal that receives an intermediate data input signal, and having a data output terminal that generates a second output signal that is synchronized with said system clock signal and that is responsive to said intermediate data input signal; and
- logic circuitry interposed between said data output terminal of said first clocked logic circuit and said data input terminal of said second clocked logic circuit that generates said intermediate data input signal in response to said first output signal, said logic circuitry preventing said intermediate data input signal from changing until after a sufficient time delay from said predetermined signal transition of said intermediate clocking signal so that any oscillations in said first data output signal caused by a change in the logic level of said asynchronous input signal to close in time to said predetermined signal transition of said intermediate clocking signal will have ceased.

* * * * *

UNITED STATES PATENT AND TRADEMARK OFFICE
CERTIFICATE OF CORRECTION

PATENT NO. : 4,973,860
DATED : November 27, 1990
INVENTOR(S) : Thomas E. Ludwig

It is certified that error appears in the above-indentified patent and that said Letters Patent is hereby corrected as shown below:

In Column 9, Line 24, change "270" to --270'--.

In Column 10, Line 35, change "CLK/2" to --$\overline{CLK/2}$--.

In Column 10, Line 37, change "$\overline{CLK/2}$" to --CLK/2--.

In Column 15, Line 16, change "CLK/4" to --$\overline{CLK/4}$--.

In Column 15, Line 16, change "CLK/2" to --$\overline{CLK/2}$--.

Signed and Sealed this

Third Day of August, 1993

Attest:

MICHAEL K. KIRK

Attesting Officer     Acting Commissioner of Patents and Trademarks